US012720036B2

(12) United States Patent
Ma et al.

(10) Patent No.: US 12,720,036 B2
(45) Date of Patent: Aug. 25, 2026

(54) DISPLAY DEVICE AND LUMINANCE COMPENSATION METHOD THEREFOR, AND COMPUTER STORAGE MEDIUM

(71) Applicant: BOE Technology Group Co., Ltd., Beijing (CN)

(72) Inventors: Xitong Ma, Beijing (CN); Xing Zhou, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 302 days.

(21) Appl. No.: 18/703,980

(22) PCT Filed: Nov. 11, 2022

(86) PCT No.: PCT/CN2022/131357
§ 371 (c)(1),
(2) Date: Apr. 23, 2024

(87) PCT Pub. No.: WO2024/098378
PCT Pub. Date: May 16, 2024

(65) Prior Publication Data
US 2026/0164007 A1 Jun. 11, 2026

(51) Int. Cl.
*H04N 13/327* (2018.01)
*G09G 3/00* (2006.01)
*H04N 13/383* (2018.01)

(52) U.S. Cl.
CPC ........... *H04N 13/327* (2018.05); *G09G 3/003* (2013.01); *H04N 13/383* (2018.05);
(Continued)

(58) Field of Classification Search
CPC ........ G02B 30/27; G02B 30/30; G02B 30/31; G02B 30/28; G02B 30/29; G02B 27/0172;
(Continued)

(56) References Cited

U.S. PATENT DOCUMENTS 7,683,999 B2 * 3/2010 Komatsu ........... G02F 1/134363 349/141
2019/0265492 A1 * 8/2019 Yuuki .................... H04N 13/31
(Continued)

FOREIGN PATENT DOCUMENTS

CN 101398608 A 4/2009
CN 102487446 A 6/2012
(Continued)

*Primary Examiner* — Farhan Mahmud
(74) *Attorney, Agent, or Firm* — Workman Nydegger

(57) ABSTRACT

A display device and a luminance compensation method therefor, and a computer storage medium. The luminance compensation method for a display device includes: determining an irregular electric field region of a liquid crystal grating formed by a liquid crystal grating layer in a three-dimensional display mode; determining a luminance compensation coefficient of each sub-pixel according to a proportional relation between the sub-pixel and the irregular electric field region; and performing luminance compensation on each sub-pixel in the irregular electric field region according to the luminance compensation coefficient, and increasing luminance of each sub-pixel in the irregular electric field region.

20 Claims, 6 Drawing Sheets

(52) U.S. Cl.
CPC . *G09G 2320/0626* (2013.01); *G09G 2354/00* (2013.01); *G09G 2360/16* (2013.01)

(58) Field of Classification Search
CPC ............ G02B 2027/0174; G02B 30/26; H04N 13/305; H04N 13/31; H04N 13/398; H04N 13/128; H04N 2213/001; H04N 13/327; G09G 3/36; G09G 2320/02; G09G 2320/0233; G09G 2320/066; G09G 2320/0626; G02F 1/133512; G02F 1/134363
See application file for complete search history.

(56) References Cited

U.S. PATENT DOCUMENTS

| | | | | |
|---|---|---|---|---|
| 2019/0313086 | A1* | 10/2019 | Contreras ............ | H04N 13/279 |
| 2022/0070427 | A1 | 3/2022 | Ha et al. | |

FOREIGN PATENT DOCUMENTS

| | | | |
|---|---|---|---|
| CN | 102857774 | A | 1/2013 |
| CN | 103278973 | A | 9/2013 |
| CN | 107515474 | A | 12/2017 |
| CN | 209311807 | U | 8/2019 |
| CN | 115134576 | A | 9/2022 |
| KR | 20130064155 | A | 6/2013 |
| WO | 2010038310 | A1 | 4/2010 |

* cited by examiner

DISPLAY DEVICE AND LUMINANCE COMPENSATION METHOD THEREFOR, AND COMPUTER STORAGE MEDIUM

CROSS-REFERENCE TO RELATED APPLICATIONS

This disclosure is a National Stage of International Application No. PCT/CN2022/131357, filed Nov. 11, 2022, which is hereby incorporated by reference in its entirety.

TECHNICAL FIELD

The present disclosure relates to the technical field of display, in particular to a display device and a luminance compensation method therefor, and a computer storage medium.

BACKGROUND

With the continuous development of the display technology, the three-dimensional (3D) display technology has received increasing attention. The 3D display technology is capable of displaying three-dimensional and vivid pictures. Its principle lies in that a left eye image and a right eye image with certain parallax are received by a left eye and a right eye of a person respectively. After the two parallactic images are received by the left and right eyes of the person respectively, a 3D visual display effect can be constructed by superimposing and fusing the image information by the brain.

SUMMARY

Embodiments of the disclosure provide a luminance compensation method for a display device. The display device includes: a display panel and a liquid crystal grating layer located at a side of the display panel. The display panel includes a plurality of sub-pixels arranged in an array. The method includes:

- determining an irregular electric field region of a liquid crystal grating formed by the liquid crystal grating layer in a three-dimensional display mode;
- determining a luminance compensation coefficient of each sub-pixel according to a proportional relation between the sub-pixel and the irregular electric field region; and
- performing luminance compensation on each sub-pixel in the irregular electric field region according to the luminance compensation coefficient, and increasing luminance of each sub-pixel in the irregular electric field region.

In some embodiments, before the determining a luminance compensation coefficient of each sub-pixel according to a proportional relation between the sub-pixel and the irregular electric field region, the method further includes:

- determining a viewpoint image corresponding to a picture to be displayed according to left eye coordinates and right eye coordinates of a user, where the viewpoint image includes a left eye view and a right eye view; and
- performing luminance compensation on each sub-pixel in the irregular electric field region according to the luminance compensation coefficient, and increasing luminance of each sub-pixel in the irregular electric field region, which specifically include:
- performing luminance compensation on a viewpoint corresponding to each sub-pixel in the irregular electric field region in the viewpoint image according to the luminance compensation coefficient, increasing luminance of the viewpoint corresponding to each sub-pixel in the irregular electric field region, and obtaining a luminance compensated viewpoint image.

In some embodiments, the determining a luminance compensation coefficient of each sub-pixel in the irregular electric field region according to a proportional relation between the sub-pixel and the irregular electric field region specifically includes:

- determining an influence coefficient s_ker of influence on the sub-pixel from the irregular electric field region according to a ratio of a width of the irregular electric field region in a first direction to a width of the sub-pixel in the first direction, where the first direction is a direction in which the liquid crystal grating is arranged periodically; and
- determining the luminance compensation coefficient s_com=1+s_ker.

In some embodiments, before the determining a luminance compensation coefficient of each sub-pixel according to a proportional relation between the sub-pixel and the irregular electric field region, the method further includes: determining a position parameter s1 of each sub-pixel in the viewpoint image; and

- the determining an influence coefficient s_ker of influence on the sub-pixel from the irregular electric field region according to a ratio of a width of the irregular electric field region in a first direction to a width of the sub-pixel in the first direction specifically includes:
- determining whether the position parameter s1 of the sub-pixel in the viewpoint image satisfies any one of the following conditions:
- $s1 \in [0, s2]$, where s2 is the width of the irregular electric field region in the first direction;

$$s1 \in \left[\frac{s3}{2} - s2,\ \frac{s3}{2} + s2\right],$$

where s3 is a total width of a left eye viewpoint and a right eye viewpoint in the viewpoint image;

$$s1 \in [s3 - s2,\ s3];$$

- if not, s_ker=0; and
- if so, determining whether the width s2 of the irregular electric field region in the first direction and the width s4 of the sub-pixel in the first direction satisfy the following condition:

$$s2 < s4/2;$$

- if so, s_ker=s2/s4; and
- if not, s_ker=0.5+s1/s4.

In some embodiments, the display panel includes a display region. The display region includes N sub-pixels in the first direction. For an ith sub-pixel of the N sub-pixels, a position parameter s1 of the ith sub-pixel in the viewpoint image is determined specifically as follows:

- obtaining a distance s5 between a center of the ith sub-pixel and a first edge of the display region, a total width s3 of a left eye viewpoint and a right eye viewpoint in the viewpoint image, a distance s6 between a first viewpoint image corresponding to a user viewing position in the viewpoint image and the first edge, and a distance s7 between a boundary of the first viewpoint image corresponding to the user viewing position in the viewpoint image away from the first edge and a center of the display region in the first direction, where i is an integer greater than 0 and less than or equal to N, an extension direction of the first edge intersects with the first direction, and the first edge and the user viewing position are located on a same side of the center of the display region in the first direction; and determining a remainder of (s5+s7−s6)/s7 as the position parameter s1.

In some embodiments, the distance between a center of the ith sub-pixel and the first edge of the display region is determined specifically as follows:

determining the distance between the center of the ith sub-pixel and the first edge of the display region according to the following formula:

$$s5 = \{i - 1/2) * s4.$$

In some embodiments, before the determining a luminance compensation coefficient of each sub-pixel according to a proportional relation between the sub-pixel and the irregular electric field region, the method further includes:

determining the distance s7 between the boundary of the first viewpoint image corresponding to the user viewing position in the viewpoint image away from the first edge and the center of the display region in the first direction, and determining a width s8 of the display region in the first direction, where a remainder of (s8/2+s7)/s5 is the distance s6 between a boundary of the first viewpoint image corresponding to the user viewing position in the viewpoint image close to the first edge and the first edge.

In some embodiments, before the determining a luminance compensation coefficient of each sub-pixel according to a proportional relation between the sub-pixel and the irregular electric field region, the method further includes:

obtaining the left eye coordinates (x1, y1, z1) and the right eye coordinates (x2, y2, z2) of the user, and determining binocular center coordinates (x0, y0, z0) of the user according to the left eye coordinates and the right eye coordinates, where x0=(x1+x2)/2, y0=(y1+y2)/2, and z0=(z1+z2)/2; and the determining the distance s7 between the boundary of the first viewpoint image corresponding to the user viewing position in the viewpoint image away from the first edge and the center of the display region in the first direction specifically includes:

obtaining a distance h between the liquid crystal grating and the display panel; and determining s7 according to the following formula:

$$s7 = x0 * h / z0.$$

In some embodiments, the total width s3 of a left eye viewpoint and a right eye viewpoint in the viewpoint image is obtained specifically as follows:

obtaining a period s9 of the liquid crystal grating; and determining the total width s3 of a left eye viewpoint and a right eye viewpoint in the viewpoint image according to the following formula:

$$s3 = s9 * ((z0 + h)/z0).$$

In some embodiments, the performing luminance compensation on a viewpoint corresponding to each sub-pixel in the irregular electric field region in the viewpoint image according to the luminance compensation coefficient, increasing luminance of the viewpoint corresponding to each sub-pixel in the irregular electric field region, and obtaining a luminance compensated viewpoint image specifically include:

determining whether pixel_old*s_com is greater than 256 for the viewpoint corresponding to each sub-pixel in the irregular electric field region, where pixel_old is the luminance of the viewpoint corresponding to the sub-pixel in the viewpoint image;

if so, updating the luminance of the viewpoint corresponding to the sub-pixel to pixel_new=256; and if not, updating the luminance of the viewpoint corresponding to the sub-pixel to pixel_new=pixel_old*s_com.

In some embodiments, after the performing luminance compensation on each sub-pixel in the irregular electric field region, the method further includes:

determining a drive signal corresponding to each viewpoint according to the luminance compensated viewpoint image, applying the drive signal to each sub-pixel, and generating a three-dimensional image.

The embodiments of the disclosure provide a computer storage medium, storing a computer-executable instruction. The computer-executable instruction is configured to execute steps of the method according to the embodiments of the disclosure.

The embodiments of the disclosure provide a display device. The display device includes: a display panel, a liquid crystal grating layer located at a side of the display panel, and a luminance compensation module. The display panel includes a plurality of sub-pixels arranged in an array.

The luminance compensation module is configured to determine an irregular electric field region of a liquid crystal grating formed by the liquid crystal grating layer in a three-dimensional display mode; determine a luminance compensation coefficient of each sub-pixel according to a proportional relation between the sub-pixel and the irregular electric field region; and perform luminance compensation on each sub-pixel in the irregular electric field region according to the luminance compensation coefficient, and increase luminance of each sub-pixel in the irregular electric field region.

In some embodiments, the luminance compensation module includes:

a viewpoint image generation unit configured to determine a viewpoint image corresponding to a picture to be displayed according to left eye coordinates and right eye coordinates of a user, where the viewpoint image includes a left eye view and a right eye view; and a pixel compensation unit configured to perform luminance compensation on a viewpoint corresponding to each sub-pixel in the irregular electric field region in the viewpoint image according to the luminance compensation coefficient, increase luminance of the viewpoint corresponding to each sub-pixel in the irregular electric field region, and obtain a luminance compensated viewpoint image.

In some embodiments, the luminance compensation module further includes:

an influence coefficient calculation unit configured to determine an influence coefficient s_ker of influence on the sub-pixel from the irregular electric field region according to a ratio of a width of the irregular electric field region in a first direction to a width of the sub-pixel in the first direction, where the first direction is a direction in which the liquid crystal grating is arranged periodically; and a luminance compensation coefficient generation unit configured to generate the luminance compensation coefficient s_com according to the following formula:

$$s\_com = 1 + s\_ker.$$

In some embodiments, the luminance compensation module further includes:

a sub-pixel position calculation unit configured to determine a position parameter s1 of each sub-pixel in the viewpoint image; and the influence coefficient calculation unit is specifically configured to:

determine whether the position parameter s1 of the sub-pixel in the viewpoint image satisfies any one of the following conditions:

s1∈[0, s2], where s2 is the width of the irregular electric field region in the first direction;

$$s1 \in \left[\frac{s3}{2} - s2, \frac{s3}{2} + s2\right],$$

where s3 is a total width of a left eye viewpoint and a right eye viewpoint in the viewpoint image;

$$s1 \in [s3 - s2, s3];$$

if not, s_ker=0; and if so, determine whether the width s2 of the irregular electric field region in the first direction and the width s4 of the sub-pixel in the first direction satisfy the following condition:

$$s2 < s4/2;$$

if so, s_ker=s2/s4; and if not, s_ker=0.5+s1/s4.

In some embodiments, the display panel includes a display region. The display region includes N sub-pixels in the first direction. For an ith sub-pixel of the N sub-pixels, the sub-pixel position calculation unit is specifically configured to:

obtain a distance s5 between a center of the ith sub-pixel and a first edge of the display region, a total width s3 of a left eye viewpoint and a right eye viewpoint in the viewpoint image, a distance s6 between a first viewpoint image corresponding to a user viewing position in the viewpoint image and the first edge, and a distance s7 between a boundary of the first viewpoint image corresponding to the user viewing position in the viewpoint image away from the first edge and a center of the display region in the first direction, where i is an integer greater than 0 and less than or equal to N, an extension direction of the first edge intersects with the first direction, and the first edge and the user viewing position are located on a same side of the center of the display region in the first direction; and determine a remainder of (s5+s7−s6)/s7 as the position parameter s1.

In some embodiments, the sub-pixel position calculation unit is specifically configured to obtain the distance between the center of the ith sub-pixel and the first edge of the display region according to the following formula:

s5=(i−½)*s4, where s4 is the width of the sub-pixel in the first direction.

In some embodiments, the sub-pixel position calculation unit is configured to obtain the distance s6 between a boundary of the first viewpoint image corresponding to the user viewing position in the viewpoint image close to the first edge and the first edge as follows:

obtaining the distance s7 between the boundary of the first viewpoint image corresponding to the user viewing position in the viewpoint image away from the first edge and the center of the display region in the first direction, and obtaining a width s8 of the display region in the first direction, where a remainder of (s8/2+s7)/s5 is the distance s6 between a boundary of the first viewpoint image corresponding to the user viewing position in the viewpoint image close to the first edge and the first edge.

In some embodiments, the luminance compensation module further includes:

an eye tracking unit configured to obtain the left eye coordinates (x1, y1, z1) and the right eye coordinates (x2, y2, z2) of the user, and transmit the left eye coordinates (x1, y1, z1) and the right eye coordinates (x2, y2, z2) of the user to the sub-pixel position calculation unit.

The sub-pixel position calculation unit is further configured to determine binocular center coordinates (x0, y0, z0) of the user according to the obtained left eye coordinates (x1, y1, z1) and right eye coordinates (x2, y2, z2) of the user, where x0=(x1+x2)/2, y0=(y1+y2)/2, and z0=(z1+z2)/2; and the sub-pixel position calculation unit obtains the distance s7 between the boundary of the first viewpoint image corresponding to the user viewing position in the viewpoint image away from the first edge and the center of the display region in the first direction as follows:

obtaining a distance h between the liquid crystal grating and the display panel; and determining s7 according to the following formula:

$$s7 = x0 * h/z0.$$

In some embodiments, the sub-pixel position calculation unit obtains the total width s3 of a left eye viewpoint and a right eye viewpoint in the viewpoint image as follows:

obtaining a period s9 of the liquid crystal grating; and determining the total width s3 of a left eye viewpoint and a right eye viewpoint in the viewpoint image according to the following formula:

$$s3 = s9 * ((z0 + h)/z0).$$

In some embodiments, the pixel compensation unit performs luminance compensation on the viewpoint corresponding to each sub-pixel in the irregular electric field region in the viewpoint image according to the luminance compensation coefficient, increases the luminance of the viewpoint corresponding to each sub-pixel in the irregular electric field region, and obtains the luminance compensated viewpoint image as follows:

determining whether pixel_old*s_com is greater than 256 for the viewpoint corresponding to each sub-pixel, where pixel_old is the luminance of the viewpoint corresponding to the sub-pixel in the viewpoint image;

if so, updating the luminance of the viewpoint corresponding to the sub-pixel to pixel_new=256; and if not, updating the luminance of the viewpoint corresponding to the sub-pixel to pixel_new=pixel_old*s_com.

In some embodiments, the luminance compensation module is further configured to:

determine a drive signal corresponding to each viewpoint according to the luminance compensated viewpoint image, apply the drive signal to each sub-pixel, and generate a three-dimensional image.

BRIEF DESCRIPTION OF FIGURES

In order to explain the technical solutions in embodiments of the disclosure more clearly, the accompanying drawings required in the description of the embodiments will be described below briefly. Apparently, the accompanying drawings in the following description show merely some embodiments of the disclosure, and other drawings can be derived from these accompanying drawings by those of ordinary skill in the art without creative efforts.

DETAILED DESCRIPTION

Figure 1:
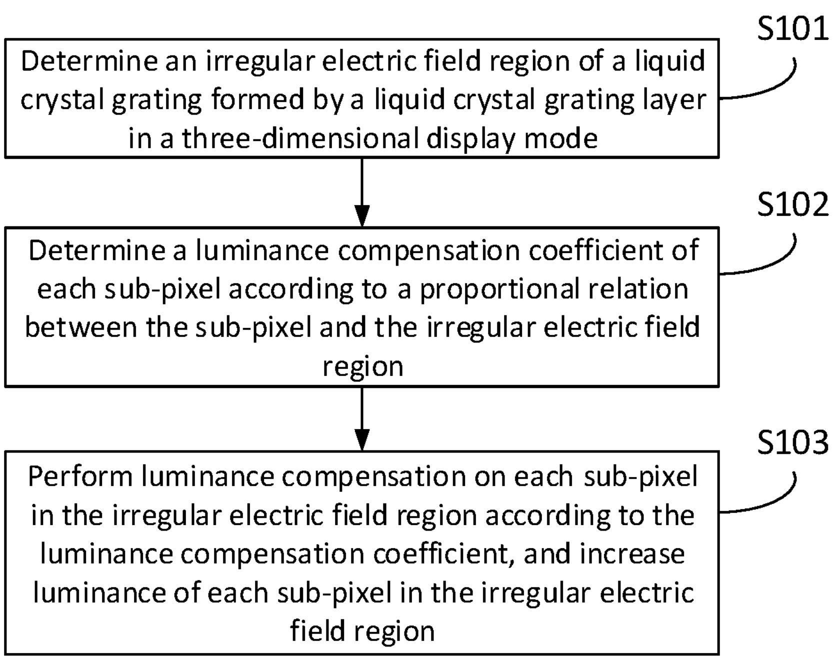
FIG. 1 is a schematic flowchart of a luminance compensation method for a display device according to an embodiment of the disclosure.

In order to make the objectives, technical solutions, and advantages in the embodiments of the disclosure clearer, the technical solutions in the embodiments of the disclosure will be clearly and completely described below in conjunction with the accompanying drawings in the embodiments of the disclosure. It is obvious that the described embodiments are some embodiments rather than all embodiments of the disclosure. Moreover, the embodiments of the disclosure and features in the embodiments can be combined with one another without conflict. Based on the described embodiments of the disclosure, all other embodiments acquired by those skilled in the art without making creative efforts fall within the scope of protection of the disclosure.

Unless otherwise defined, technical or scientific terms used in the disclosure should have ordinary meaning as understood by those of ordinary skill in the art to which the disclosure belongs. "First", "second", and similar words used in the disclosure does not denote any order, number, or importance, but are merely used to distinguish different components. "Comprise", "include" and similar words are intended to mean that an element or item in front of the word encompasses elements or items that are listed behind the word and their equivalents, but do not exclude other elements or items. "Connection", "connected" and similar words are not limited to a physical or mechanical connection, but can include a direct or indirect electrical connection.

It should be noted that sizes and shapes of all figures in the accompanying drawings do not reflect true scales, and are merely intended to illustrate contents of the disclosure. Moreover, the same or similar reference numerals denote the same or similar elements or elements having the same or similar functions throughout.

In the prior art, a liquid crystal grating is used as a light-splitting structure of one type of 3D display devices. However, since the liquid crystal grating is used to control bright and dark areas by means of an electric field, an irregular electric field exists at edges of electrodes, which affects deflection of liquid crystals and affects a light transmission rate of some sub-pixels, resulting in an impact on luminance of the sub-pixels.

Embodiments of the disclosure provide a luminance compensation method for a display device. As shown in FIG. 1, the method includes:

S101, determine an irregular electric field region of a liquid crystal grating formed by a liquid crystal grating layer in a three-dimensional display mode;

S102, determine a luminance compensation coefficient of each sub-pixel according to a proportional relation between the sub-pixel and the irregular electric field region; and

S103, perform luminance compensation on each sub-pixel in the irregular electric field region according to the luminance compensation coefficient, and increase luminance of each sub-pixel in the irregular electric field region.

Figure 2:
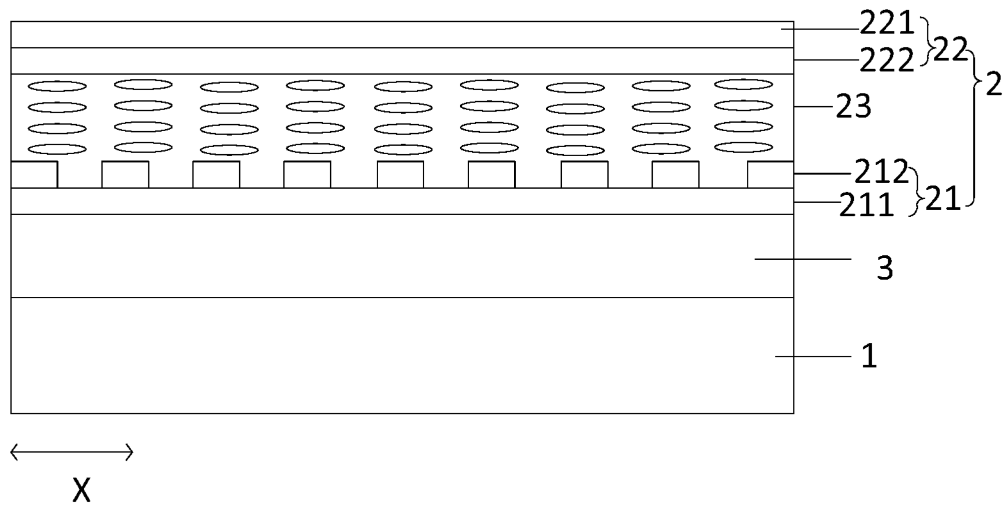
FIG. 2 is a schematic structural diagram of a display device according to an embodiment of the disclosure.
Figure 3:
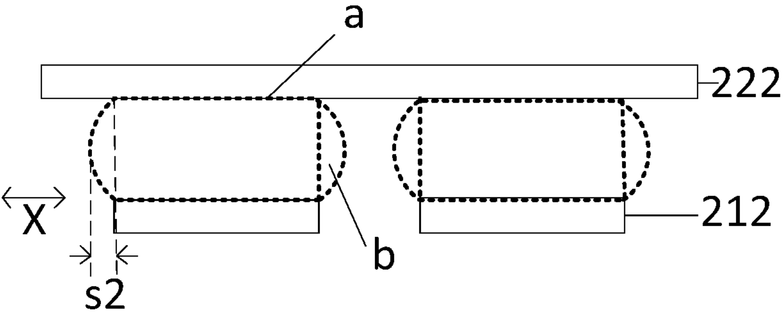
FIG. 3 is a schematic diagram of an irregular electric field region of a liquid crystal grating according to an embodiment of the disclosure.

It should be noted that in implementation, as shown in FIG. 2, the display device provided in the embodiments of the disclosure includes: a display panel 1 and a liquid crystal grating layer 2 located at a side of the display panel 1. The display panel 1 includes a plurality of sub-pixels arranged in an array. The liquid crystal grating layer 2 includes a first substrate 21 and a second substrate 22 arranged opposite each other, and a liquid crystal layer 23 arranged between the first substrate 21 and the second substrate 22. The first substrate 21 is located at a side of the liquid crystal layer 23 facing the display panel 1, and the second substrate 22 is located at a side of the liquid crystal layer 23 facing away from the display panel 1. The first substrate 21 includes a first base substrate 211 and a plurality of first transparent electrodes 212 located between the first base substrate 211 and the liquid crystal layer 23. The second substrate 22 includes a second base substrate 221 and a second transparent electrode 222 located between the second base substrate 221 and the liquid crystal layer 23. The first transparent electrodes 212 are strip electrodes. The plurality of first transparent electrodes 212 are arranged in a first direction X. The second transparent electrode 222 is a planar electrode. In specific implementation, a drive voltage is applied to the first transparent electrodes and the second transparent electrode, and then liquid crystals in liquid crystal layers in some regions are control to deflect. Transparent regions and non-transparent regions are alternately arranged, that is, a liquid crystal grating arranged in the first direction X periodically is formed. As shown in FIG. 3, a region A is an electric field region formed between the first transparent electrodes 212 and the second transparent electrode 222. The electric field region is not a regular rectangle but has irregular electric field regions B at edges of the first transparent electrodes. The irregular electric field regions B influence deflection of the liquid crystals and further influence light transmittance.

It should be noted that a corresponding relation between the liquid crystal grating formed by the liquid crystal grating layer and an irregular electric field region of the liquid crystal grating may be obtained in advance. For example, a corresponding relation between the drive voltage for forming the liquid crystal grating and the irregular electric field region may be determined and stored. In this way, during three-dimensional display, based on a drive voltage of a formed liquid crystal grating, a position, a width and other parameters of an irregular electric field region of the liquid crystal grating formed under control of the drive voltage can be determined.

The luminance compensation method for a display device provided in the embodiments of the disclosure includes: determine a luminance compensation coefficient of each sub-pixel according to a proportional relation between the sub-pixel and the irregular electric field region, perform luminance compensation on the sub-pixel in the irregular electric field region according to the luminance compensation coefficient, and increase luminance of the sub-pixel in the irregular electric field region. Therefore, an influence of the irregular electric field region on the light transmittance of the sub-pixel can be eliminated, a display effect can be improved, and user experience can be improved.

In some embodiments, before S102 of determining a luminance compensation coefficient of each sub-pixel according to a proportional relation between the sub-pixel and the irregular electric field region, the method further includes:

determine a viewpoint image corresponding to a picture to be displayed according to left eye coordinates and right eye coordinates of a user, where the viewpoint image includes a left eye view and a right eye view; and perform luminance compensation on each sub-pixel in the irregular electric field region according to the luminance compensation coefficient, and increase luminance of each sub-pixel in the irregular electric field region, which specifically include:

perform luminance compensation on a viewpoint corresponding to each sub-pixel in the irregular electric field region in the viewpoint image according to the luminance compensation coefficient, increase luminance of the viewpoint corresponding to each sub-pixel in the irregular electric field region, and obtain a luminance compensated viewpoint image.

According to the embodiments of the disclosure, the luminance of the viewpoint corresponding to each sub-pixel in the irregular electric field region in the viewpoint image is compensated to obtain the luminance compensated viewpoint image, then corresponding drive signals can be loaded on the sub-pixels in the display panel according to the luminance compensated viewpoint image, and a three-dimensional image corresponding to a picture to be displayed is formed.

In some embodiments, after the step of performing luminance compensation on each sub-pixel in the irregular electric field region, S103 further includes:

determine a drive signal corresponding to each viewpoint according to the luminance compensated viewpoint image, apply the drive signal to each sub-pixel, and generate a three-dimensional image.

In some embodiments, S102 of determining a luminance compensation coefficient of each sub-pixel in the irregular electric field region according to a proportional relation between the sub-pixel and the irregular electric field region specifically includes:

S1021, determine an influence coefficient s_ker of influence on the sub-pixel from the irregular electric field region according to a ratio of a width of the irregular electric field region in a first direction to a width of the sub-pixel in the first direction, where the first direction is a direction in which the liquid crystal grating is arranged periodically; and

S1022, determine the luminance compensation coefficient s_com=1+s_ker.

According to the luminance compensation method for a display device provided in the embodiments of the disclosure, the influence coefficient of influence on the sub-pixel from the irregular electric field region is determined according to the ratio of the width s2 of the irregular electric field region in the first direction to the width s4 of the sub-pixel 5 in the first direction X. The luminance compensation coefficient is determined according to the influence coefficient. Then luminance compensation is performed according to the luminance compensation coefficient, such that the luminance compensation accuracy can be improved.

Figure 4:
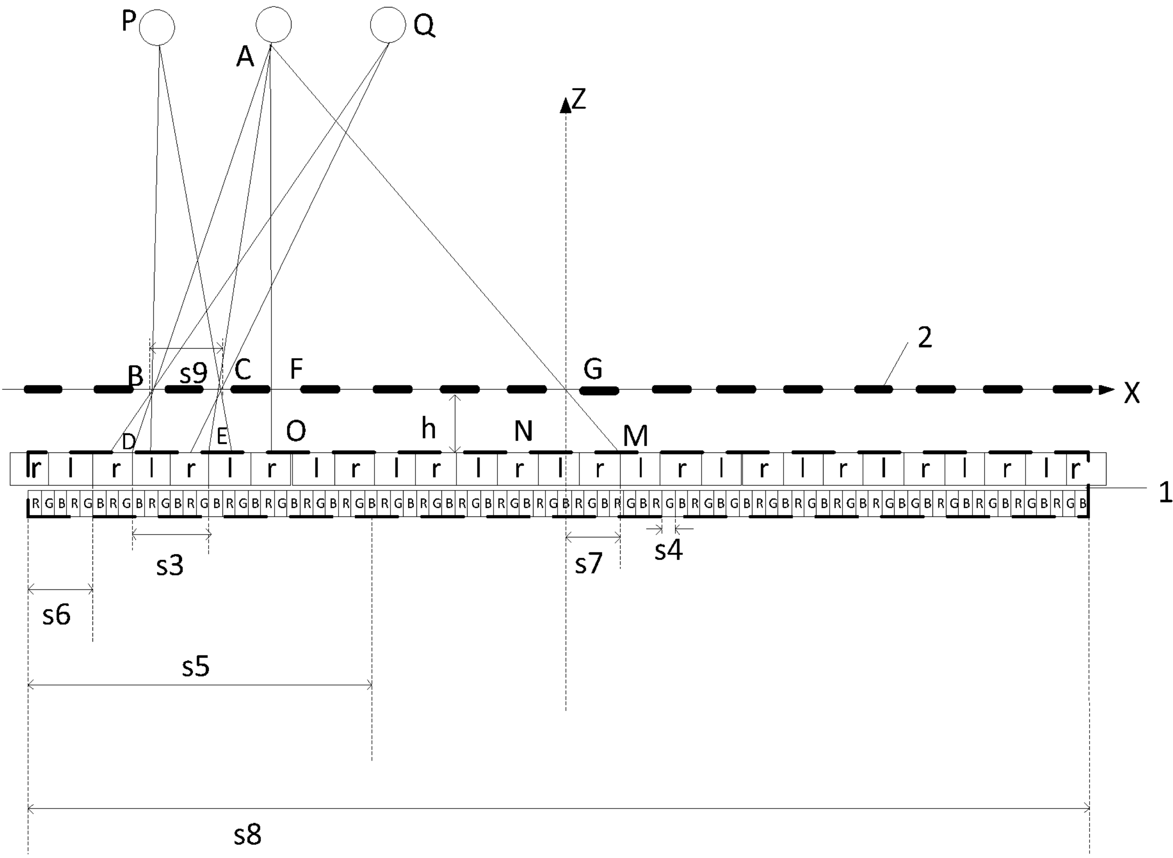
FIG. 4 is a schematic diagram of another display device according to an embodiment of the disclosure.

In some embodiments, before the step of determining a luminance compensation coefficient of each sub-pixel according to a proportional relation between the sub-pixel and the irregular electric field region, the method further includes: determine a position parameter s1 of each sub-pixel in the viewpoint image; and the S1021 of determining an influence coefficient s_ker of influence on the sub-pixel from the irregular electric field region according to a ratio of a width of the irregular electric field region in a first direction to a width of the sub-pixel in the first direction specifically includes:

determine whether the position parameter s1 of the sub-pixel in the viewpoint image satisfies any one of the following conditions:

s1∈[0, s2], where as shown in FIGS. 3 and 4, s2 is the width of the irregular electric field region in the first direction;

$$s1 \in \left[\frac{s3}{2} - s2, \frac{s3}{2} + s2\right],$$

where as shown in FIG. 4, s3 is a total width of a left eye viewpoint and a right eye viewpoint in the viewpoint image;

$$s1 \in [s3 - s2, s3];$$

if not, s_ker=0; and if so, determine whether the width s2 of the irregular electric field region in the first direction and the width s4 of the sub-pixel in the first direction X satisfy the following condition:

$$s2 < s4/2;$$

if so, s_ker=s2/s4; and if not, s_ker=0.5+s1/s4.

Figure 5:
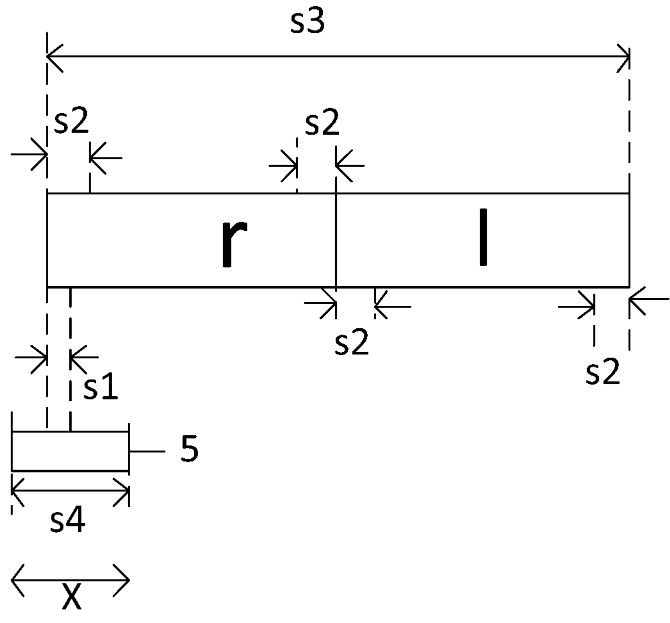
FIG. 5 is a schematic diagram illustrating a relation between an irregular electric field region and a sub-pixel according to an embodiment of the disclosure.
Figure 6:
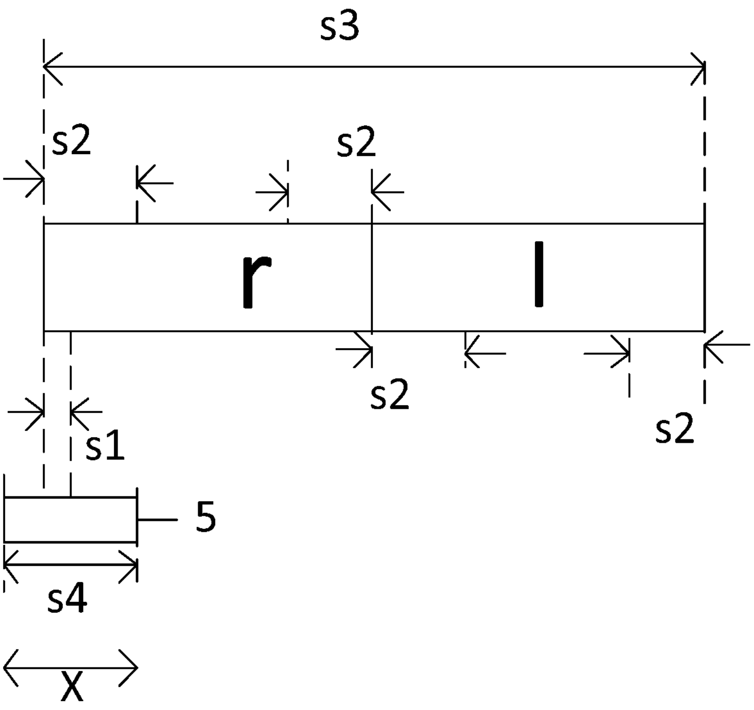
FIG. 6 is a schematic diagram illustrating another relation between an irregular electric field region and a sub-pixel according to an embodiment of the disclosure.

It should be noted that as shown in FIGS. 5 and 6, the position parameter s1 of the sub-pixel in the viewpoint image is a distance between a center of a sub-pixel 5 and a boundary of a first viewpoint image corresponding to a user viewing position in the viewpoint image. For each sub-pixel, when the position parameter s1 of the sub-pixel in the viewpoint image satisfies any of the following conditions: $s1 \in [0, s2]$, $$s1 \in \left[\frac{s3}{2} - s2, \frac{s3}{2} + s2\right],$$

and $s1 \in [s3-s2, s3]$, the sub-pixel is considered to be in the irregular electric field region, and the light transmittance of the sub-pixel is influenced by the irregular electric field region, and luminance compensation needs to be performed on the viewpoint of the sub-pixel in the viewpoint image. When the position parameter s1 of the sub-pixel in the viewpoint image does not satisfy any of the following conditions: $s1 \in [0, s2]$, $$s1 \in \left[\frac{s3}{2} - s2, \frac{s3}{2} + s2\right]$$

and $s1 \in [s3-s2, s3]$, the sub-pixel is considered not to be in the irregular electric field region, the influence coefficient s_ker of influence on the sub-pixel from the irregular electric field region is equal to 0, and no luminance compensation is required for the viewpoint of the sub-pixel in the viewpoint image.

As shown in FIG. 5, in the luminance compensation method for a display device provided in the embodiments of the disclosure, when the ratio of the width s2 of the irregular electric field region in the first direction X to the width s4 of the sub-pixel 5 in the first direction X is less than s4/2, it can be considered that the irregular electric field region has a less influence on the sub-pixel. Correspondingly, the influence coefficient of influence on the sub-pixel from the irregular electric field region is less, and s2/s4 is taken as the influence coefficient. As shown in FIG. 6, when the ratio of the width s2 of the irregular electric field region in the first direction to the width s4 of the sub-pixel in the first direction X is greater than or equal to s4/2, it is considered that the irregular electric field region has a greater influence on the sub-pixel. Correspondingly, the influence coefficient of influence on the sub-pixel from the irregular electric field region is greater, and the influence coefficient needs to be determined according to the position parameter s1 of the sub-pixel.

In specific implementation, in order to determine the position parameter s1 of the sub-pixel in the viewpoint image, the following parameters need to be determined: the width s2 of the irregular electric field region in the first direction, the total width s3 of a left eye viewpoint and a right eye viewpoint in the viewpoint image, the width s4 of the sub-pixel in the first direction X, a distance s5 between the center of the sub-pixel and the first edge of the display region, a distance s6 between a boundary of the first viewpoint image corresponding to the user viewing position in the viewpoint image close to the first edge and the first edge, a distance s7 between the boundary of the first viewpoint image corresponding to the user viewing position in the viewpoint image away from the first edge and the center of the display region in the first direction, a width s8 of the display region in the first direction, a period s9 of the liquid crystal grating, and a distance h between the liquid crystal grating and the display panel.

In some embodiments, for an ith sub-pixel of N sub-pixels, a position parameter s1 of the ith sub-pixel in the viewpoint image is determined specifically as follows:

obtain a distance s5 between a center of the ith sub-pixel and a first edge of the display region, a total width s3 of a left eye viewpoint and a right eye viewpoint in the viewpoint image, a distance s6 between a first viewpoint image corresponding to a user viewing position in the viewpoint image and the first edge, and a distance s7 between a boundary of the first viewpoint image corresponding to the user viewing position in the viewpoint image away from the first edge and a center of the display region in the first direction, where i is an integer greater than 0 and less than or equal to N, an extension direction of the first edge intersects with the first direction, and the first edge and the user viewing position are located on a same side of the center of the display region in the first direction; and determine a remainder of (s5+s7−s6)/s7 as the position parameter s1 of the ith sub-pixel.

In some embodiments, before the determining a luminance compensation coefficient of each sub-pixel according to a proportional relation between the sub-pixel and the irregular electric field region, the method further includes:

obtain the left eye coordinates (x1, y1, z1) and the right eye coordinates (x2, y2, z2) of the user, and determine binocular center coordinates (x0, y0, z0) of the user according to the left eye coordinates and the right eye coordinates, where x0=(x1+x2)/2, y0=(y1+y2)/2, and z0=(z1+z2)/2.

It should be noted that in FIG. 4, P is a position of a left eye, Q is a position of a right eye, A is a center position of the left eye and the right eyes, that is, coordinates of point P are (x1, y1, z1), coordinates of point Q are (x2, y2, z2), and coordinates of point A are (x0, y0, z0). In order to clearly show a correspondence relation between a viewpoint image including left eye viewpoints I and right eye viewpoints r and sub-pixels, FIG. 4 shows the left eye viewpoints I, the right eye viewpoints r and the sub-pixels simultaneously in the region of the display panel 1. The left eye viewpoints I and the right eye viewpoints r are alternately arranged in the first direction X in the viewpoint image. In FIG. 4, the sub-pixels include red sub-pixels R, blue sub-pixels B, and green sub-pixels G. The display panel includes a display region. The sub-pixels are located in the display region. The display region includes N sub-pixels in the first direction.

In specific implementation, after the left eye coordinates (x1, y1, z1) and the right eye coordinates (x2, y2, z2) of the user are obtained, the viewpoint image corresponding to the picture to be displayed may be determined according to the left eye coordinates and the right eye coordinates of the user.

In some embodiments, the total width s3 of a left eye viewpoint and a right eye viewpoint in the viewpoint image is determined specifically as follows:

obtain a period s9 of the liquid crystal grating; and determine the total width s3 of a left eye viewpoint and a right eye viewpoint in the viewpoint image according to the following formula:

$$s3 = s9 * ((z0 + h)/z0).$$

It should be noted that as shown in FIG. 4, a triangle ABC and a triangle ADE are similar, such that $$\frac{s9}{s3} = \frac{z0}{h + z0},$$

and then s3=s9*((z0+h)/z0).

In some embodiments, the distance s7 between the boundary of the first viewpoint image corresponding to the user viewing position in the viewpoint image away from the first edge and the center of the display region in the first direction is obtained specifically as follows:

obtain a distance h between the liquid crystal grating and the display panel; and determine s7 according to the following formula:

$$s7 = x0 * h/z0.$$

It should be noted that as shown in FIG. 4, a triangle MAO and a triangle MGN are similar, such that $$\frac{s7}{s7 - x0} = \frac{h}{h + z0},$$

and then s/=x0+n/z0.

In some embodiments, the distance between the center of the ith sub-pixel and the first edge of the display region is obtained according to the following formula:

$$s5 = (i - 1/2) * s4.$$

It should be noted that in FIG. 4, the eyes of the user are located on a left side of the center G of the display device, then a left edge of the display region is the first edge, and s5 is a distance between the center of the ith sub-pixel and the left edge of the display region.

In some embodiments, the step of obtaining the distance s6 between a boundary of the first viewpoint image corresponding to the user viewing position in the viewpoint image close to the first edge and the first edge includes:

obtain the distance s7 between the boundary of the first viewpoint image corresponding to the user viewing position in the viewpoint image away from the first edge and the center of the display region in the first direction, and obtain a width s8 of the display region in the first direction, where a remainder of (s8/2+s7)/s5 is the distance s6 between a boundary of the first viewpoint image corresponding to the user viewing position in the viewpoint image close to the first edge and the first edge.

It should be noted that as shown in FIG. 4, an intersection point of an extended line connecting a left-right eye center A and a center G of the liquid crystal grating layer 2 and the viewpoint image is M, and point M is located at the boundary of the first viewpoint image corresponding to the user viewing position away from the first edge.

In some embodiments, the step of performing luminance compensation on a viewpoint corresponding to each sub-pixel in the irregular electric field region in the viewpoint image according to the luminance compensation coefficient, increasing luminance of the viewpoint corresponding to each sub-pixel in the irregular electric field region, and obtaining a luminance compensated viewpoint image specifically include:

determine whether pixel_old*s_com is greater than 256 for the viewpoint corresponding to each sub-pixel in the irregular electric field region, where pixel_old is the luminance of the viewpoint corresponding to the sub-pixel in the viewpoint image;

if so, update the luminance of the viewpoint corresponding to the sub-pixel to pixel_new=256; and if not, update the luminance of the viewpoint corresponding to the sub-pixel to pixel_new=pixel_old*s_com.

In specific implementation, after the position parameter s1 is determined for each sub-pixel, the method further includes:

determine whether the position parameter s1 of the sub-pixel satisfies the following conditions:

$$s1 > s3/2;$$

if so, determine that the sub-pixel belongs to the left eye view, and pixel_old is set from the left eye view; and if not, determine that the sub-pixel belongs to the right eye view, and pixel_old is set from the right eye view.

Based on the same inventive concept, the embodiments of the disclosure further provide a computer storage medium, storing a computer-executable instruction. The computer-executable instruction is configured to execute steps of the method according to the embodiments of the disclosure.

Figure 7:
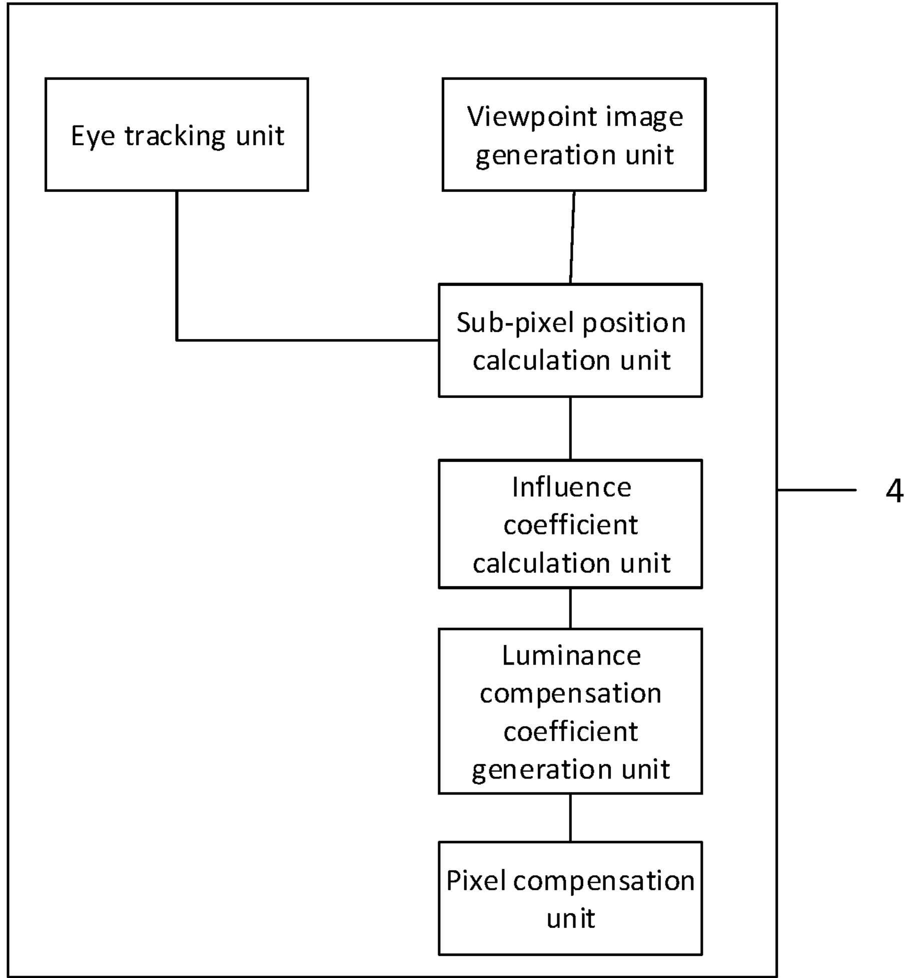
FIG. 7 is a schematic structural diagram of a luminance compensation module according to an embodiment of the disclosure.

Based on the same inventive concept, the embodiments of the disclosure further provide a display device. As shown in FIG. 2, the display device includes: a display panel 1, a liquid crystal grating layer 2 located at a side of the display panel, and a luminance compensation module 4 as shown in FIG. 7. The display panel 1 includes a plurality of sub-pixels (not shown) arranged in an array.

The luminance compensation module 4 is configured to determine an irregular electric field region of a liquid crystal grating formed by the liquid crystal grating layer in a three-dimensional display mode; determine a luminance compensation coefficient of each sub-pixel according to a proportional relation between the sub-pixel and the irregular electric field region; and perform luminance compensation on each sub-pixel in the irregular electric field region according to the luminance compensation coefficient, and increase luminance of each sub-pixel in the irregular electric field region.

The display device provided in the embodiments of the disclosure includes a luminance compensation module. The luminance compensation module determines a luminance compensation coefficient of each sub-pixel according to a proportional relation between the sub-pixel and the irregular electric field region, performs luminance compensation on the sub-pixel in the irregular electric field region according to the luminance compensation coefficient, and increases luminance of the sub-pixel in the irregular electric field region. Therefore, an influence of the irregular electric field region on the light transmittance of the sub-pixel can be eliminated, a display effect can be improved, and user experience can be improved.

In some embodiments, as shown in FIG. 7, the luminance compensation module 4 includes:

a viewpoint image generation unit configured to determine a viewpoint image corresponding to a picture to be displayed according to left eye coordinates and right eye coordinates of a user, where the viewpoint image includes a left eye view and a right eye view; and a pixel compensation unit configured to perform luminance compensation on a viewpoint corresponding to each sub-pixel in the irregular electric field region in the viewpoint image according to the luminance compensation coefficient, increase luminance of the viewpoint corresponding to each sub-pixel in the irregular electric field region, and obtain a luminance compensated viewpoint image.

In some embodiments, as shown in FIG. 7, the luminance compensation module 4 further includes:

an influence coefficient calculation unit configured to determine an influence coefficient s_ker of influence on the sub-pixel from the irregular electric field region according to a ratio of a width of the irregular electric field region in a first direction to a width of the sub-pixel in the first direction, where the first direction is a direction in which the liquid crystal grating is arranged periodically; and a luminance compensation coefficient generation unit configured to generate the luminance compensation coefficient s_com according to the following formula:

$$s\_com = 1 + s\_ker.$$

In some embodiments, as shown in FIG. 7, the luminance compensation module 4 further includes:

a sub-pixel position calculation unit configured to determine a position parameter s1 of each sub-pixel in the viewpoint image; and the influence coefficient calculation unit is specifically configured to:

determine whether the position parameter s1 of the sub-pixel in the viewpoint image satisfies any one of the following conditions:

s1∈[0, s2], where s2 is the width of the irregular electric field region in the first direction;

$$s1 \in \left[\frac{s3}{2} - s2, \frac{s3}{2} + s2\right],$$

where s3 is a total width of a left eye viewpoint and a right eye viewpoint in the viewpoint image;

$$s1 \in [s3 - s2, s3];$$

if not, s_ker=0; and if so, determine whether the width s2 of the irregular electric field region in the first direction and the width s4 of the sub-pixel in the first direction satisfy the following condition:

$$s2 < s4/2;$$

if so, s_ker=s2/s4; and if not, s_ker=0.5+s1/s4.

In specific implementation, the luminance compensation module may further include a storage unit configured to store a corresponding relation between the drive voltage for forming the liquid crystal grating and the irregular electric field region. In this way, during three-dimensional display, the storage unit transmits the width s2 of the irregular electric field region corresponding to the current liquid crystal grating in the first direction to the influence coefficient calculation unit.

In some embodiments, the display panel includes a display region. The display region includes N sub-pixels in the first direction. For an ith sub-pixel of the N sub-pixels, the sub-pixel position calculation unit is specifically configured to:

obtain a distance s5 between a center of the ith sub-pixel and a first edge of the display region, a total width s3 of a left eye viewpoint and a right eye viewpoint in the viewpoint image, a distance s6 between a first viewpoint image corresponding to a user viewing position in the viewpoint image and the first edge, and a distance s7 between a boundary of the first viewpoint image corresponding to the user viewing position in the viewpoint image away from the first edge and a center of the display region in the first direction, where i is an integer greater than 0 and less than or equal to N, an extension direction of the first edge intersects with the first direction, and the first edge and the user viewing position are located on a same side of the center of the display region in the first direction; and determine a remainder of (s5+s7−s6)/s7 as the position parameter s1.

In some embodiments, the sub-pixel position calculation unit is specifically configured to obtain the distance s5 between the center of the ith sub-pixel and the first edge of the display region according to the following formula:

s5=(i−½)*s4, where s4 is the width of the sub-pixel in the first direction.

In some embodiments, the sub-pixel position calculation unit is configured to obtain the distance s6 between a boundary of the first viewpoint image corresponding to the user viewing position in the viewpoint image close to the first edge and the first edge as follows:

obtain the distance s7 between the boundary of the first viewpoint image corresponding to the user viewing position in the viewpoint image away from the first edge and the center of the display region in the first direction, and obtain a width s8 of the display region in the first direction, where a remainder of (s8/2+s7)/s5 is the distance s6 between a boundary of the first viewpoint image corresponding to the user viewing position in the viewpoint image close to the first edge and the first edge.

In some embodiments, as shown in FIG. 7, the luminance compensation module 4 further includes:

an eye tracking unit configured to obtain the left eye coordinates (x1, y1, z1) and the right eye coordinates (x2, y2, z2) of the user, and transmit the left eye coordinates (x1, y1, z1) and the right eye coordinates (x2, y2, z2) of the user to the sub-pixel position calculation unit;

the sub-pixel position calculation unit is further configured to determine binocular center coordinates (x0, y0, z0) of the user according to the obtained left eye coordinates (x1, y1, z1) and right eye coordinates (x2, y2, z2) of the user, where x0=(x1+x2)/2, y0=(y1+y2)/2, and z0=(z1+z2)/2; and the sub-pixel position calculation unit obtains the distance s7 between the boundary of the first viewpoint image corresponding to the user viewing position in the viewpoint image away from the first edge and the center of the display region in the first direction as follows:

obtain a distance h between the liquid crystal grating and the display panel; and determine s7 according to the following formula:

$$s7 = x0 * h/z0.$$

In some embodiments, the sub-pixel position calculation unit obtains the total width s3 of a left eye viewpoint and a right eye viewpoint in the viewpoint image as follows:

obtain a period s9 of the liquid crystal grating; and determine the total width s3 of a left eye viewpoint and a right eye viewpoint in the viewpoint image according to the following formula:

$$s3 = s9 * \{(z0 + h)/z0\}.$$

In some embodiments, the pixel compensation unit performs luminance compensation on the viewpoint corresponding to each sub-pixel in the irregular electric field region in the viewpoint image according to the luminance compensation coefficient, increases the luminance of the viewpoint corresponding to each sub-pixel in the irregular electric field region, and obtains the luminance compensated viewpoint image as follows:

determine whether pixel_old*s_com is greater than 256 for the viewpoint corresponding to each sub-pixel, where pixel_old is the luminance of the viewpoint corresponding to the sub-pixel in the viewpoint image;

if so, update the luminance of the viewpoint corresponding to the sub-pixel to pixel_new=256; and if not, update the luminance of the viewpoint corresponding to the sub-pixel to pixel_new=pixel_old*s_com.

It should be noted that the sub-pixel position calculation unit is further configured to determine, after determining the position parameter s1 of each sub-pixel, whether the position parameter s1 of the sub-pixel satisfies the following condition:

$$s1 > s3/2;$$

if so, determine that the sub-pixel belongs to the left eye view; and if not, determine that the sub-pixel belongs to the right eye view.

It should be noted that for each sub-pixel, in a case that it belongs to the left eye view, pixel_old is set from the left eye view when the pixel compensation unit performs luminance compensation; and in a case that it belongs to the right eye view, pixel_old is set from the right eye view when the pixel compensation unit performs luminance compensation.

In some embodiments, the luminance compensation module is further configured to:

determine a drive signal corresponding to each viewpoint according to the luminance compensated viewpoint image, apply the drive signal to each sub-pixel, and generate a three-dimensional image.

Figure 8:
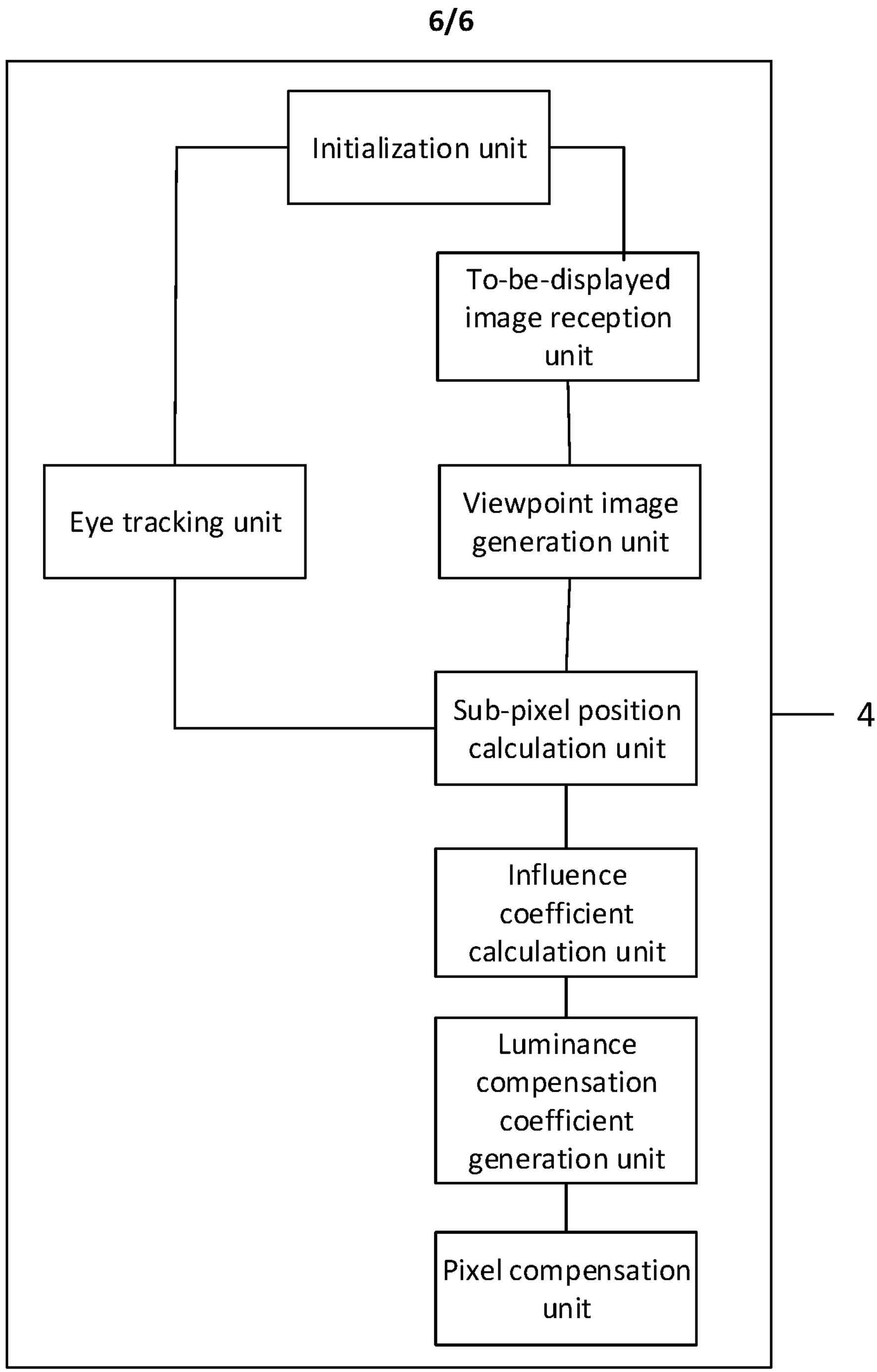
FIG. 8 is a schematic structural diagram of another luminance compensation module according to an embodiment of the disclosure.

In some embodiments, as shown in FIG. 8, the luminance compensation module 4 further includes: an initialization unit and a to-be-displayed image reception unit.

Next, the luminance compensation module shown in FIG. 8 is taken as an example to illustrate a luminance compensation process of the display device provided in the embodiments of the disclosure.

In specific implementation, an initialization unit is configured to, for example, power-on and initialize the eye tracking unit and the to-be-displayed image reception unit. Specifically, a camera included in the eye tracking unit, that is, the initialization unit may be configured to initialize the camera.

In specific implementation, after the to-be-displayed image reception unit is initialized, the to-be-displayed image reception unit receives an image to be displayed and transmits information about the image to be displayed to the viewpoint image generation unit. The viewpoint image generation unit generates a viewpoint image including a left eye view and a right eye view according to three-dimensional video format information carried by the information about the image to be displayed. The to-be-displayed image reception unit includes, for example, a video interface such as high-definition multimedia interface (HDMI)/Display port (DP). A 3D video stream format of the 3D video format information includes 3D SIDE_BY_SID/3D_FRAME_BY_FREAME. In the information about the image to be displayed, an arrangement mode of the left eye viewpoints and the right eye viewpoints may be that the left eye viewpoints and the right eye viewpoints are located in the same arrangement mode, and alternatively that the left eye viewpoints and the right eye viewpoints are alternately arranged. The viewpoint image generation unit includes a left eye view generation module and a right eye view generation module, such that no matter what arrangement mode of the left eye viewpoints and the right eye viewpoints, the viewpoint image generation unit may obtain the left eye view and the right eye view through the information about the image to be displayed.

In specific implementation, the eye tracking unit further includes a face detection unit. The camera is configured to collect images and transmit the images to the face detection unit. The face detection unit performs face detection, determines obtained left eye coordinates (x1, y1, z1) and right eye coordinates (x2, y2, z2) of the user after detecting a face, and outputs the left eye coordinates (x1, y1, z1) and the right eye coordinates (x2, y2, z2) of the user to the sub-pixel position calculation unit. Then, the sub-pixel position calculation unit calculates the viewpoint image according to the left eye coordinates (x1, y1, z1) and the right eye coordinates (x2, y2, z2), and obtains the following parameters: binocular center coordinates (x0, y0, z0) of the user, the total width s3 of a left eye viewpoint and a right eye viewpoint in the viewpoint image, the distance s6 between a first viewpoint image corresponding to a user viewing position in the viewpoint image and the first edge, and the distance s7 between a boundary of the first viewpoint image corresponding to the user viewing position in the viewpoint image away from the first edge and a center of the display region in the first direction. The sub-pixel position calculation unit further needs to obtain the width s2 of the irregular electric field region in the first direction, the width s4 of the sub-pixel in the first direction X, the width s8 of the display region in the first direction, the period s9 of the liquid crystal grating, and the distance h between the liquid crystal grating and the display panel. The sub-pixel position calculation unit determines the position parameter s1 of each sub-pixel according to the obtained parameters, and transmits the position parameter to the influence coefficient calculation unit. Then the influence coefficient calculation unit determines the influence coefficient s_ker of influence on the sub-pixel from the irregular electric field region by a ratio of the width of the irregular electric field region in the first direction to the width of the sub-pixel in the first direction, and transmits the influence coefficient s_ker to the luminance compensation coefficient generation unit. The luminance compensation coefficient generation unit generates a luminance compensation coefficient s_com from the influence coefficient s_ker and transmits the luminance compensation coefficient s_com to the pixel compensation unit. The pixel compensation unit performs luminance compensation on the viewpoint image according to the luminance compensation coefficient s_com, and obtains a luminance compensated viewpoint image. Then, a drive signal corresponding to each viewpoint is determined according to the luminance compensated viewpoint image, the drive signal is applied to each sub-pixel, and a three-dimensional image is generated.

The display device provided in the embodiment of the disclosure may be any product or component with a display function, such as a television, a display, and a notebook computer. Other essential components of the display device will be understood by those of ordinary skill in the art, and are not repeated herein, nor are they intended to be limiting of the disclosure.

In summary, according to the display device and the luminance compensation method therefor, and the computer-readable storage medium provided in the embodiments of the disclosure, a luminance compensation coefficient of each sub-pixel is determined according to a proportional relation between the sub-pixel and the irregular electric field region, luminance compensation is performed on the sub-pixel in the irregular electric field region according to the luminance compensation coefficient, and luminance of the sub-pixel in the irregular electric field region is increased. Therefore, an influence of the irregular electric field region on the light transmittance of the sub-pixel can be eliminated, a display effect can be improved, and user experience can be improved.

Those skilled in the art will appreciate that embodiments of the disclosure can be provided as a method, system, or computer program product. Thus, the disclosure can take the form of an entire hardware embodiment, an entire software embodiment or an embodiment combining software and hardware aspects. Furthermore, the disclosure can take the form of a computer program product implemented on one or more computer-available storage media (including but not limited to a magnetic disk memory, a compact disc read-only memory (CD-ROM) an optical memory, etc.) encompassing computer-available program codes.

The disclosure is described with reference to flowcharts and/or block diagrams of a method, an apparatus (system), and a computer program product according to the embodiments of the disclosure. It should be understood that each flow and/or block of the flowcharts and/or block diagrams, and combinations of flows and/or blocks in the flowcharts and/or block diagrams can be implemented by computer program instructions. These computer program instructions can be provided for a processor of a general purpose computer, a special-purpose computer, an embedded processor, or other programmable data processing apparatuses to generate a machine, such that the instructions, which are executed by the processor of the computer or other programmable data processing apparatuses, can generate devices for implementing functions specified in one or more flows in the flowcharts and/or one or more blocks in the block diagrams.

These computer program instructions can also be stored in a computer-readable memory that can direct the computers or other programmable data processing apparatuses to work in a particular manner, such that the instructions stored in the computer-readable memory generate an article of manufacture including an instruction device that implements the functions specified in one or more flows in the flowcharts and/or one or more blocks in the block diagrams.

These computer program instructions can also be loaded onto the computers or other programmable data processing apparatuses to execute a series of operational steps on the computers or other programmable apparatuses so as to generate a process implemented by the computers, such that the instructions that are executed by the computers or other programmable apparatuses provide steps for implementing the functions specified in one or more flows in the flowcharts and/or one or more blocks in the block diagrams.

While the preferred embodiments of the disclosure have been described, additional alterations and modifications to those embodiments may be made by those skilled in the art once the basic inventive concept is apparent to those skilled in the art. Thus, the appended claims are intended to be interpreted to include the preferred embodiments and all alterations and modifications that fall within the scope of the disclosure.

It will be apparent to those skilled in the art that various modifications and variations can be made to the embodiments of the disclosure without departing from the spirit and scope of the embodiments of the disclosure. Thus, if modifications and variations to the embodiments of the disclosure fall within the scope of the appended claims of the disclosure and their equivalents, the disclosure is intended to include such modifications and variations as well.

What is claimed is:

1. A luminance compensation method for a display device, wherein the display device comprises: a display panel and a liquid crystal grating layer located at a side of the display panel; the display panel comprises a plurality of sub-pixels arranged in an array; and the method comprises:

determining an irregular electric field region of a liquid crystal grating formed by the liquid crystal grating layer in a three-dimensional display mode;

determining a luminance compensation coefficient of each sub-pixel according to a proportional relation between the sub-pixel and the irregular electric field region; and performing luminance compensation on each sub-pixel in the irregular electric field region according to the luminance compensation coefficient, and increasing luminance of each sub-pixel in the irregular electric field region.

2. The method according to claim 1, wherein before the determining a luminance compensation coefficient of each sub-pixel according to a proportional relation between the sub-pixel and the irregular electric field region, the method further comprises:

determining a viewpoint image corresponding to a picture to be displayed according to left eye coordinates and right eye coordinates of a user, wherein the viewpoint image comprises a left eye view and a right eye view; and the performing luminance compensation on each sub-pixel in the irregular electric field region according to the luminance compensation coefficient, and increasing luminance of each sub-pixel in the irregular electric field region, comprise:

performing luminance compensation on a viewpoint corresponding to each sub-pixel in the irregular electric field region in the viewpoint image according to the luminance compensation coefficient, increasing luminance of the viewpoint corresponding to each sub-pixel in the irregular electric field region, and obtaining a luminance compensated viewpoint image.

3. The method according to claim 2, wherein the determining a luminance compensation coefficient of each sub-pixel in the irregular electric field region according to a proportional relation between the sub-pixel and the irregular electric field region, comprises:

determining an influence coefficient s_ker of influence on the sub-pixel from the irregular electric field region according to a ratio of a width of the irregular electric field region in a first direction to a width of the sub-pixel in the first direction, wherein the first direction is a direction in which the liquid crystal grating is arranged periodically; and determining the luminance compensation coefficient s_com=1+s_ker.

4. The method according to claim 3, wherein before the determining a luminance compensation coefficient of each sub-pixel according to a proportional relation between the sub-pixel and the irregular electric field region, the method further comprises: determining a position parameter s1 of each sub-pixel in the viewpoint image; and the determining an influence coefficient s_ker of influence on the sub-pixel from the irregular electric field region according to a ratio of a width of the irregular electric field region in a first direction to a width of the sub-pixel in the first direction, comprises:

determining whether the position parameter s1 of the sub-pixel in the viewpoint image satisfies any one of following conditions:

$s1 \in [0, s2]$, wherein s2 is the width of the irregular electric field region in the first direction;

$$s1 \in \left[\frac{s3}{2} - s2, \frac{s3}{2} + s2\right],$$

wherein s3 is a total width of a left eye viewpoint and a right eye viewpoint in the viewpoint image;

$$s1 \in [s3 - s2, s3];$$

in response to the position parameter s1 of the sub-pixel in the viewpoint image not satisfying any one of the conditions, s_ker=0; and in response to the position parameter s1 of the sub-pixel in the viewpoint image satisfying any one of the conditions, determining whether the width s2 of the irregular electric field region in the first direction and the width s4 of the sub-pixel in the first direction satisfy following condition:

$$s2 < s4/2;$$

in response to the width s2 of the irregular electric field region in the first direction and the width s4 of the sub-pixel in the first direction satisfying the condition, s_ker=s2/s4; and in response to the width s2 of the irregular electric field region in the first direction and the width s4 of the sub-pixel in the first direction not satisfying the condition, s_ker=0.5+s1/s4.

5. The method according to claim 4, wherein the display panel comprises a display region, and the display region comprises N sub-pixels in the first direction; and for an ith sub-pixel of the N sub-pixels, a position parameter s1 of the ith sub-pixel in the viewpoint image is determined as follows:

obtaining a distance s5 between a center of the ith sub-pixel and a first edge of the display region, a total width s3 of a left eye viewpoint and a right eye viewpoint in the viewpoint image, a distance s6 between a first viewpoint image corresponding to a user viewing position in the viewpoint image and the first edge, and a distance s7 between a boundary of the first viewpoint image corresponding to the user viewing position in the viewpoint image away from the first edge and a center of the display region in the first direction, wherein i is an integer greater than 0 and less than or equal to N, an extension direction of the first edge intersects with the first direction, and the first edge and the user viewing position are located on a same side of the center of the display region in the first direction; and determining a remainder of (s5+s7−s6)/s7 as the position parameter s1.

6. The method according to claim 5, wherein before the determining a luminance compensation coefficient of each sub-pixel according to a proportional relation between the sub-pixel and the irregular electric field region, the method further comprises:

determining the distance between the center of the ith sub-pixel and the first edge of the display region according to a following formula:

$$s5 = (i - 1/2) * s4.$$

7. The method according to claim 5, wherein before the determining a luminance compensation coefficient of each sub-pixel according to a proportional relation between the sub-pixel and the irregular electric field region, the method further comprises:

determining the distance s7 between the boundary of the first viewpoint image corresponding to the user viewing position in the viewpoint image away from the first edge and the center of the display region in the first direction, and determining a width s8 of the display region in the first direction, wherein a remainder of (s8/2+s7)/s5 is the distance s6 between a boundary of the first viewpoint image corresponding to the user viewing position in the viewpoint image close to the first edge and the first edge.

8. The method according to claim 7, wherein before the determining a luminance compensation coefficient of each sub-pixel according to a proportional relation between the sub-pixel and the irregular electric field region, the method further comprises:

obtaining the left eye coordinates (x1, y1, z1) and the right eye coordinates (x2, y2, z2) of the user, and determining binocular center coordinates (x0, y0, z0) of the user according to the left eye coordinates and the right eye coordinates, wherein x0=(x1+x2)/2, y0=(y1+y2)/2, and z0=(z1+z2)/2; and the determining the distance s7 between the boundary of the first viewpoint image corresponding to the user viewing position in the viewpoint image away from the first edge and the center of the display region in the first direction, comprises:

obtaining a distance h between the liquid crystal grating and the display panel; and determining s7 according to a following formula:

$$s7 = x0 * h/z0.$$

9. The method according to claim 8, wherein the obtaining the total width s3 of a left eye viewpoint and a right eye viewpoint in the viewpoint image, comprises:

obtaining a period s9 of the liquid crystal grating; and determining the total width s3 of a left eye viewpoint and a right eye viewpoint in the viewpoint image according to the following formula:

$$s3 = s9 * ((z0 + h)/z0).$$

10. The method according to claim 3, wherein the performing luminance compensation on a viewpoint corresponding to each sub-pixel in the irregular electric field region in the viewpoint image according to the luminance compensation coefficient, increasing luminance of the viewpoint corresponding to each sub-pixel in the irregular electric field region, and obtaining a luminance compensated viewpoint image, comprise:

determining whether pixel_old*s_com is greater than 256 for the viewpoint corresponding to each sub-pixel in the irregular electric field region, wherein pixel_old is the luminance of the viewpoint corresponding to the sub-pixel in the viewpoint image;

in response to pixel_old*s_com being greater than 256 for the viewpoint corresponding to each sub-pixel in the irregular electric field region, updating the luminance of the viewpoint corresponding to the sub-pixel to pixel_new=256; and in response to pixel_old*s_com not being greater than 256 for the viewpoint corresponding to each sub-pixel in the irregular electric field region, updating the luminance of the viewpoint corresponding to the sub-pixel to pixel_new=pixel_old*s_com.

11. A display device, comprising: a display panel, a liquid crystal grating layer located at a side of the display panel, and a luminance compensation module, wherein the display panel comprises a plurality of sub-pixels arranged in an array; and the luminance compensation module is configured to determine an irregular electric field region of a liquid crystal grating formed by the liquid crystal grating layer in a three-dimensional display mode; determine a luminance compensation coefficient of each sub-pixel according to a proportional relation between the sub-pixel and the irregular electric field region; and perform luminance compensation on each sub-pixel in the irregular electric field region according to the luminance compensation coefficient, and increase luminance of each sub-pixel in the irregular electric field region.

12. The display device according to claim 11, wherein the luminance compensation module comprises:

a viewpoint image generation unit configured to determine a viewpoint image corresponding to a picture to be displayed according to left eye coordinates and right eye coordinates of a user, wherein the viewpoint image comprises a left eye view and a right eye view; and a pixel compensation unit configured to perform luminance compensation on a viewpoint corresponding to each sub-pixel in the irregular electric field region in the viewpoint image according to the luminance compensation coefficient, increase luminance of the viewpoint corresponding to each sub-pixel in the irregular electric field region, and obtain a luminance compensated viewpoint image.

13. The display device according to claim 12, wherein the luminance compensation module further comprises:

an influence coefficient calculation unit configured to determine an influence coefficient s_ker of influence on the sub-pixel influenced from the irregular electric field region according to a ratio of a width of the irregular electric field region in a first direction to a width of the sub-pixel in the first direction, wherein the first direction is a direction in which the liquid crystal grating is arranged periodically; and a luminance compensation coefficient generation unit configured to generate the luminance compensation coefficient s_com according to a following formula:

$$\text{s\_com} = 1 + \text{s\_ker}.$$

14. The display device according to claim 13, wherein the luminance compensation module further comprises:

a sub-pixel position calculation unit configured to determine a position parameter s1 of each sub-pixel in the viewpoint image; and the influence coefficient calculation unit is configured to:

determine whether the position parameter s1 of the sub-pixel in the viewpoint image satisfies any one of following conditions:

s1∈[0, s2], wherein s2 is the width of the irregular electric field region in the first direction;

$$s1 \in \left[\frac{s3}{2} - s2, \frac{s3}{2} + s2\right],$$

wherein s3 is a total width of a left eye viewpoint and a right eye viewpoint in the viewpoint image;

$$s1 \in [s3 - s2, s3];$$

in response to the position parameter s1 of the sub-pixel in the viewpoint image satisfying any one of the conditions, s_ker=0; and in response to the position parameter s1 of the sub-pixel in the viewpoint image not satisfying any one of the conditions, determine whether the width s2 of the irregular electric field region in the first direction and the width s4 of the sub-pixel in the first direction satisfy following condition:

$$s2 < s4/2;$$

in response to the width s2 of the irregular electric field region in the first direction and the width s4 of the sub-pixel in the first direction satisfying the condition, s_ker=s2/s4; and in response to the width s2 of the irregular electric field region in the first direction and the width s4 of the sub-pixel in the first direction not satisfying the condition, s_ker=0.5+s1/s4.

15. The display device according to claim 14, wherein the display panel comprises a display region, and the display region comprises N sub-pixels in the first direction; and for an ith sub-pixel of the N sub-pixels, the sub-pixel position calculation unit is configured to:

obtain a distance s5 between a center of the ith sub-pixel and a first edge of the display region, a total width s3 of a left eye viewpoint and a right eye viewpoint in the viewpoint image, a distance s6 between a first viewpoint image corresponding to a user viewing position in the viewpoint image and the first edge, and a distance s7 between a boundary of the first viewpoint image corresponding to the user viewing position in the viewpoint image away from the first edge and a center of the display region in the first direction, wherein i is an integer greater than 0 and less than or equal to N, an extension direction of the first edge intersects with the first direction, and the first edge and the user viewing position are located on a same side of the center of the display region in the first direction; and determine a remainder of (s5+s7−s6)/s7 as the position parameter s1.

16. The display device according to claim 15, wherein the sub-pixel position calculation unit is configured to obtain the distance between the center of the ith sub-pixel and the first edge of the display region according to following formula:

s5=(i−½)*s4, wherein s4 is the width of the sub-pixel in the first direction.

17. The display device according to claim 15, wherein the sub-pixel position calculation unit is configured to obtain the distance s6 between a boundary of the first viewpoint image corresponding to the user viewing position in the viewpoint image close to the first edge and the first edge as follows:

obtaining the distance s7 between the boundary of the first viewpoint image corresponding to the user viewing position in the viewpoint image away from the first edge and the center of the display region in the first direction, and obtaining a width s8 of the display region in the first direction, wherein a remainder of (s8/2+s7)/s5 is the distance s6 between a boundary of the first viewpoint image corresponding to the user viewing position in the viewpoint image close to the first edge and the first edge.

18. The display device according to claim 17, wherein the luminance compensation module further comprises:

an eye tracking unit configured to obtain the left eye coordinates (x1, y1, z1) and the right eye coordinates (x2, y2, z2) of the user, and transmit the left eye coordinates (x1, y1, z1) and the right eye coordinates (x2, y2, z2) of the user to the sub-pixel position calculation unit;

the sub-pixel position calculation unit is further configured to determine binocular center coordinates (x0, y0, z0) of the user according to the obtained left eye coordinates (x1, y1, z1) and right eye coordinates (x2, y2, z2) of the user, wherein x0=(x1+x2)/2, y0=(y1+y2)/2, and z0=(z1+z2)/2; and the sub-pixel position calculation unit obtains the distance s7 between the boundary of the first viewpoint image corresponding to the user viewing position in the viewpoint image away from the first edge and the center of the display region in the first direction as follows:

obtaining a distance h between the liquid crystal grating and the display panel; and determining s7 according to the following formula:

$$s7 = x0 * h/z0.$$

19. The display device according to claim 18, wherein the sub-pixel position calculation unit obtains the total width s3 of a left eye viewpoint and a right eye viewpoint in the viewpoint image as follows:

obtaining a period s9 of the liquid crystal grating; and determining the total width s3 of a left eye viewpoint and a right eye viewpoint in the viewpoint image according to following formula:

$$s3 = s9 * ((z0 + h)/z0).$$

20. The display device according to claim 13, wherein the pixel compensation unit performs luminance compensation on the viewpoint corresponding to each sub-pixel in the irregular electric field region in the viewpoint image according to the luminance compensation coefficient, increases the luminance of the viewpoint corresponding to each sub-pixel in the irregular electric field region, and obtains the luminance compensated viewpoint image as follows:

determining whether pixel_old*s_com is greater than 256 for the viewpoint corresponding to each sub-pixel, wherein pixel_old is the luminance of the viewpoint corresponding to the sub-pixel in the viewpoint image;

in response to pixel_old*s_com being greater than 256 for the viewpoint corresponding to each sub-pixel, updating the luminance of the viewpoint corresponding to the sub-pixel to pixel_new=256; and in response to pixel_old*s_com not being greater than 256 for the viewpoint corresponding to each sub-pixel, updating the luminance of the viewpoint corresponding to the sub-pixel to pixel_new=pixel_old*s_com.

* * * * *